United States Patent

Luke et al.

[11] Patent Number: 5,523,036
[45] Date of Patent: Jun. 4, 1996

[54] METHODS OF MAKING TOBACCO SMOKE FILTER ELEMENTS

[75] Inventors: John A. Luke, Eastleigh; William J. Stone, Southampton, both of United Kingdom

[73] Assignee: British-American Tobacco Company Limited, Middlesex, England

[21] Appl. No.: 872,020

[22] Filed: Apr. 22, 1992

Related U.S. Application Data

[63] Continuation-in-part of Ser. No. 529,715, May 30, 1990, abandoned, which is a continuation of Ser. No. 197,842, May 24, 1988, abandoned.

[30] Foreign Application Priority Data

May 28, 1987 [GB] United Kingdom ............... 8712617

[51] Int. Cl.$^6$ .................................................. B29C 44/22
[52] U.S. Cl. ......................... 264/45.3; 264/53; 264/140; 264/148; 264/157; 264/210.1; 264/238
[58] Field of Search ........................ 264/126, 157, 264/148, 51, 53, 45.3, DIG. 13, 238, 140, 210.1

[56] References Cited

U.S. PATENT DOCUMENTS

| | | | |
|---|---|---|---|
| 3,358,695 | 12/1967 | Blakey, Jr. et al. | 264/53 |
| 4,279,848 | 7/1981 | Baxter et al. | 264/45.5 |
| 4,559,367 | 12/1985 | Hurps et al. | 264/53 |

FOREIGN PATENT DOCUMENTS 2205102  11/1988  United Kingdom ................ 131/332

Primary Examiner—Allan R. Kuhns
Attorney, Agent, or Firm—Kane, Dalsimer, Sullivan, Kurucz, Levy, Eisele and Richard

[57] ABSTRACT

A particulate plastics material, a polysaccharide and water are fed to an extruder which is operated under such heat and pressure conditions that upon emergence of the extrudate from the extruder die, the extrudate assumes a cross-section greater than that of the exit orifice of the die. The extrudate is then further processed, either by shredding to produce particulate material for feeding to filter-making section of a cigarette making machine, or by forming into smoking article filter rod lengths.

6 Claims, 2 Drawing Sheets

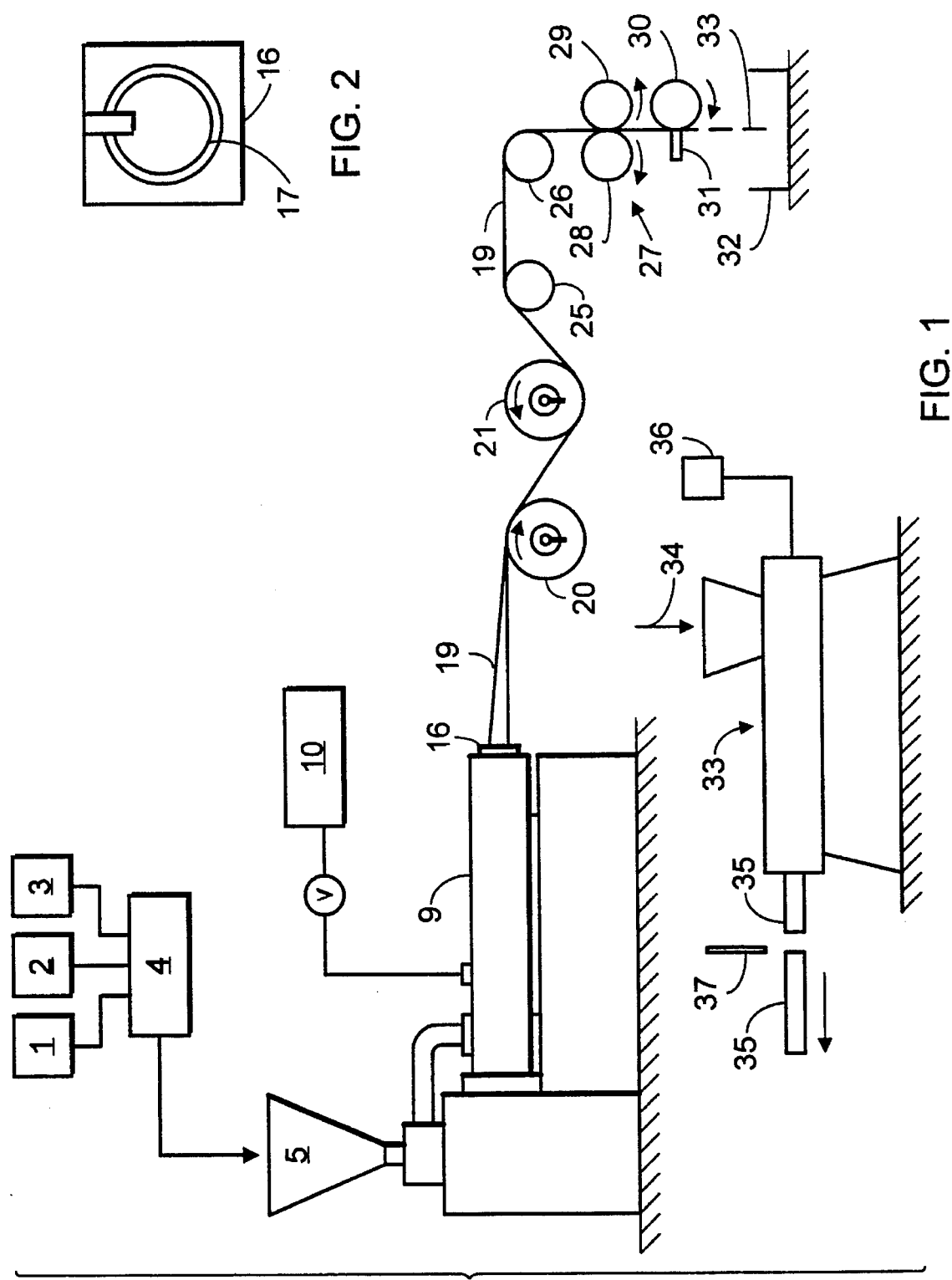

METHODS OF MAKING TOBACCO SMOKE FILTER ELEMENTS

This is a continuation-in-part of application Ser. No. 529,715, filed May 30, 1990, now abandoned, a continuation of application Ser. No. 197,842, filed May 24, 1988, now abandoned.

BACKGROUND OF THE INVENTION

1. Field of the Invention

The invention the subject of the present application relates to methods of making tobacco smoke filter elements.

2. Brief Description of the Prior Art

The most widely established method of manufacture of cigarette filter elements comprises the continuous feeding of plasticiser treated cellulose acetate tow and a web of wrapper paper to a garniture unit of a rod making machine. A driven endless band extends through the garniture unit and serves to convey the tow and wrapper paper web through the unit, wherein the wrapper papers is wrapped about the tow and lap seamed, there thereby being continuously produced a rod of circular cross-section. Downstream of the garniture unit the rod is cut into lengths a multiple, commonly six, of a unit element. Subsequent cutting of the rod lengths during the making of filter tipped cigarettes provides discrete filter elements. A similar method is used, although to a lesser extent, for the manufacture of paper filter elements, a web of crimped filter paper rather than cellulose acetate tow being fed to the garniture unit.

There have also been proposed methods of making filter rod by the extrusion of foamed thermoplastics materials. Such proposals have been disclosed in United Kingdom Patent Specification No. 451,683 (Sharman), United Kingdom Patent Specifications Nos. '1,271,274; 1,341,400; 1,442,631; 1,456,908 and 1,482,216 (Monsanto Chemicals Limited or Monsanto Limited) and in U.S. Pat. Specification No. 4,180,536 (Celanese Corporation).

Mention is made in United Kingdom Patent Specification No. 694,436 (Mayer-Neville) of a cigarette filter element formed by rolling into cylindrical form a strip of porous latex foam. Similar filter elements are disclosed in United Kingdom Patent Specification No. 799,781 (Cogepa).

United Kingdom Patent Specifications Nos. 1,122,661 and 1,279,803 (Monsanto Chemicals Limited) relate to cigarette filter elements made from an extruded, foamed thermoplastic material which has been drawn, to impart unidirectional orientation to the material, and then worked in order to break down the foam structure and to produce a three dimensional structure of interconnected fibre elements.

United Kingdom Patent Specification No. 993,602 (Du Pont) teaches a method of making cigarette filter rod wherein a polyoxymethylene is extruded as a foamed structure ribbon, the ribbon is shredded under the action of a wire brush and the shreds are wrapped in a paper web. United Kingdom Patent Specification No. 1,183,498, in the name of the present applicants, teaches the comminution of synthetic foam materials, as for example in a hammer mill, and the wrapping of the resultant particulate material in paper to provide filter rod. A class of foam materials disclosed in United Kingdom Patent Specification No. 1,205,766 (National Patent Development Corporation) is said to provide a suitable tobacco smoke filter medium, especially when the materials are in particulate form. According to United Kingdom Patent Specification No. 1,194,492 (Strickman Foundation), a tobacco smoke filtration material is provided by granulating a rigid polyurethane foam.

It is proposed in U.S. Pat. No. 3,800,808 (Brown & Williamson Tobacco Corporation) to make cigarette filter material by encasing a starch with a cellulose ester, cellulose acetate for example, swelling the starch and then removing the starch by enzymation and/or chemical hydrolysis or by solubilising the starch. The resultant foamed product is cut into shreds, which shreds are used as filter material for filter rod.

Although numerous proposals have been made in the patents literature for the use of foamed materials in or as cigarette filters, these proposals have failed to find practical application in the tobacco industry.

It is an object of the present invention to provide a method of making commercially acceptable filter elements, which method is practical and simple. It is another object of the present invention to provide a method in which readily available and inexpensive materials can be used to make commercially acceptable filter elements.

SUMMARY OF THE INVENTION

The subject invention provides a method of making tobacco smoke filter elements comprising foamed filtration material, wherein a particulate plastics material selected from the group consisting of polypropylene, cellulose acetate, polyethylene, polyester, viscose, nylon and mixtures thereof, a polysaccharide expansion medium selected from the group consisting of starch, modified starch, cellulose and modified cellulose and mixtures thereof, water, and, optionally, a binder, are fed to an extruder, the inclusion levels on a dry weight basis of the materials fed to the extruder being 5% to 95% for the plastics material, 95% to 5% for the polysaccharide and 0% to 5% for the binder, the extruder being operated under such heat and pressure conditions that immediately upon emergence of the extrudate from the extruder die, water, or at least a portion thereof, flashes into steam, thereby creating cells within the extrudate and a consequent swelling whereby the extrudate assumes a cross-section greater than that of the exit orifice of said extruder die, and said extrudate being further processed into smoking article filter elements by being fed continuously to the garniture of a filter making machine.

The invention also comprises a method of making tobacco smoke filter elements comprising foamed filtration material, wherein a particulate plastics material selected from the group consisting of polypropylene, cellulose acetate, polyethylene, polyester, viscose, nylon and mixtures thereof, a polysaccharide expansion medium selected from the group consisting of starch, modified starch, cellulose and modified cellulose and mixtures thereof, water, and, optionally, a binder, are fed to an extruder, the inclusion levels on a dry weight basis of the materials fed to the extruder being 5% to 95% for the plastics material, 95% to 5% for the polysaccharide and 0% to 5% for the binder, the extruder being operated under such heat and pressure conditions that immediately upon emergence of the extrudate from the extruder die, water, or at least a portion thereof, flashes into steam, thereby creating cells within the extrudate and a consequent swelling whereby the extrudate assumes a cross-section greater than that of the exit orifice of said extruder die, and said extrudate being further processed by being shredded and the thus produced particulate material being fed to a cigarette making machine operable to produce tobacco smoke filter elements.

If cellulose acetate is used as the plastics material, it may be derived from waste cigarette filters. Two or more plastics materials may be fed together to the extruder.

BRIEF DESCRIPTION OF THE DRAWINGS

FIG. 1 shows a schematic apparatus, used to make filter element material of the invention;

FIG. 2 shows diagrammatically an outlet end view of the die of the extruder of the apparatus of FIG. 1.

DETAILED DESCRIPTION OF THE PREFERRED EMBODIMENTS OF THE INVENTION

Figure 3:
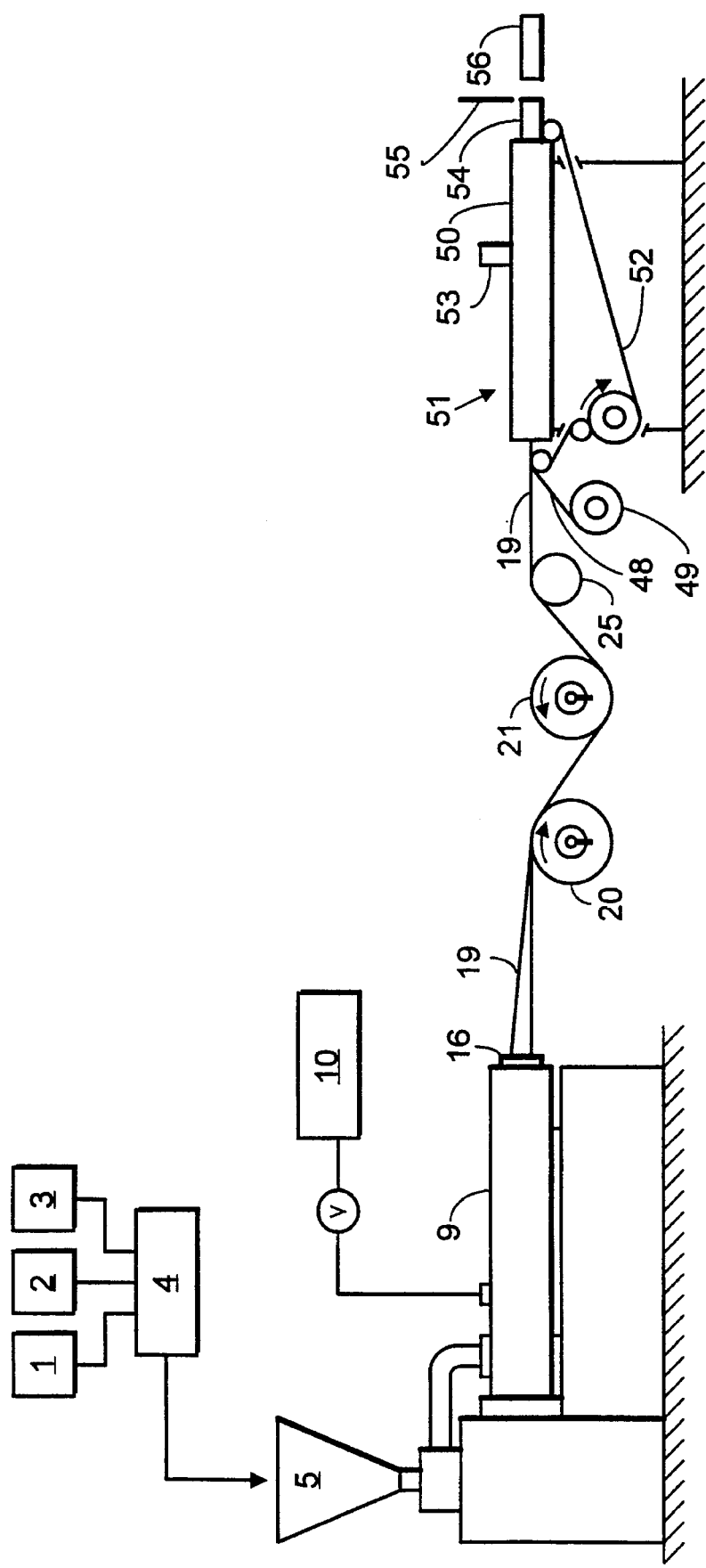
FIG. 3 shows alternative apparatus for making filter element material.

The preparation of filter material of the invention will be described below with reference to the accompanying drawings of FIGS. 1 and 2. The apparatus shown in FIG. 1 may be operated as follows:

The particulate plastics material 1 used is selected from the group consisting of polypropylene, cellulose acetate, polyethylene, polyester, viscose, nylon and mixtures thereof. The plastics material 1 may also be a polyester, viscose or nylon. If cellulose acetate is used as the plastics material, it may be derived from waste cigarette filters. Two or more plastics materials may be fed together to the hopper 5 of the extruder 9.

The polysaccharide 2 expansion medium is selected from the group consisting of starch, such as natural starch or modified starch, or cellulose such as modified cellulose and mixtures thereof.

Examples of suitable modified cellulose materials include methyl cellulose and hydroxypropyl cellulose.

The polysaccharide material 2 acts as an expansion medium in that it forms an elastomeric material which supports the plastics material when expansion (swelling) of the water-containing extrudate takes place.

Other materials 3, chalk for example, may be fed to the extruder 9 with the plastics material 1 and the starch.

The materials fed to the extruder 9 may include a binder, the inclusion level of which typically does not exceed 5%. Cellulosic binders, hydroxypropyl cellulose, carboxymethyl cellulose or sodium carboxymethyl cellulose for example, are especially useful. Alternatively, or in addition, a natural, or modified natural, binder may be used, examples being pectin, or pectin salts, and guar.

The materials fed to the extruder 9 may also include one or more of a nucleating agent, such, for example, as calcium carbonate or calcium acetate, a humectant such, for example, as glycerol, propylene glycol or sorbitol, and a lubricant such, for example, as pharmaceutical grade mineral oil.

The purpose of introducing water 10 to the extruder 9 is to produce the foamed structure of the extrudate, the water acting as a foaming agent. In the extruder 9 the materials fed thereto are subjected to conditions of heat, 100° C. to 250° C. for example, and related pressure such that immediately upon emergence from the exit die 18 of the extruder 9, the water 10, or at least a portion thereof, flashes into steam, thereby creating cells within the extrudate 19 and a consequent swelling of the extrudate 19. The water may be injected into the extruder 9 through ports in the extruder barrel and/or be fed to the extruder 9 via the feed hopper 5 thereof.

Swelling of the extrudate 19 causes it to assume a cross-section greater than that of the exit orifice 17 of the die 16.

Advantageously, the plastics material 1 and the polysaccharide 2, plus other materials if utilised, are blended in the bin 4 before being fed to the extruder 9.

The inclusion levels on a dry weight basis of the materials fed to the extruder are 5% to 95% for the plastics material and 95% to 5% for the polysaccharide. The water may account, on a weight basis, for 1% to 20% of the materials plus water fed to the extruder.

The density of the extrudate 19 may be in the range of 20 mg/cc to 500 mg/cc.

The extruder 9 used in carrying out the inventive process is suitably a twin-shaft cooker extruder.

Advantageously, the die 16 of the extruder comprises a slit-form exit orifice 17, whereby the extrudate 19 takes the form of a flat web or ribbon. Alternatively, the exit orifice 17 of the die 16 is such that the extrudate upon first issuing from the die 16 is of tubular or near-tubular cross-section, the extrudate 19 being then opened to provide a flat web or ribbon. The die 16 may according to further alternatives be configured for the extrusion of a solid rod or strand, or for the co-extrusion of a plurality of such strands.

Advantageously, the extrudate 19 when in web or ribbon form is subjected to a draw down step, exerted by paired rollers 20,21 so effecting an increase in the machine direction dimension of the extrudate 19 and a decrease in the thickness thereof.

Downstream of the roller 21 the web or ribbon form extrudate 19 passes about guide rollers 25 and 26 before entering a cutter unit generally designated by reference numeral 27. Upon entering the cutter unit 27 the extrudate 19 first passes between a pair of slitters 28 and 29 each of which is comprised of a multiplicity of rotatably driven disc knives. The slitters 28,29 serve to slit the extrudate into continuous filaments of a width of, for example, 0.8 mm. The now filamentary extrudate passes between a multibladed, rotatably driven cylinder 30 and a co-operating stationary blade 31, whereby the continuous filaments are severed to provide discrete filaments or shreds 33 of a length of, for example, 40 mm, which discrete filaments are collected in a skip 32, before being fed to the chimney of a cigarette making machine 33, as indicated by supply arrow 34. Plugwrap 36 is also supplied to the machine 33, which is operable to produce tobacco smoke filter elements, initially in the form of a continuous rod. Lengths 35 of filter rod in a multiple of unit filter element length are produced as the rod is cut by cutter 37. The lengths 35 are supplied to the filter tip attacher of a further cigarette making machine where the lengths of multiple unit filter elements are cut into double filter element lengths and attached between two cigarette rod lengths in known fashion. The double cigarettes are cut in the middle of the filter rod length to produce two filter-tipped cigarettes.

Alternatively, with reference now to FIG. 3, when the extrudate takes the form, for example, of a web or ribbon, or strand or a plurality of strands, it may be fed continuously to the garniture 50 of a filter making machine 51, wherein it is gathered into rod form and wrapped in a plugwrap. In detail, the extrudate 19 passes, together with a web 48 of cigarette paper wrapper from a bobbin 49 to the entry of a garniture 50 of the garniture unit 51. The extrudate 19 and web 48 are conveyed through the garniture unit 51 by an endless garniture tape 52, which tape is driven, by drive means not shown. During the passage of the extrudate 19 and the web 48 of cigarette paper through the garniture 50, the web 48 is caused to be wrapped about the extrudate 19 and is then lap seamed, lap seam adhesive being applied to a margin of the web 48 from an applicator designated by reference numeral 53. There issues from the outlet end of the garniture 50 a wrapped rod 54 of circular cross-section, which rod 54 is cut at intervals by cutter 55 to provide discrete filter elements 56 or lengths 56 of filter rod material of multiple filter element length. The process is similar to that commonly adopted in the making of paper filters for cigarettes.

Advantageously, before the extrudate passes to either of these rod forming stages it is subjected to the cooling action of cooling means 54.

The material fed to the filter or cigarette making machine may be treated with a bonding agent 60. Thus, for example, if the plastics material fed to the extruder comprises cellulose acetate, a triacetin bonding agent may be used. Again, for example, if the plastics material comprises polypropylene, the bonding agent may be a copolymer of ethylene and vinyl acetate.

If the extrudate is of an open cellular interior structure, the extrudate may take the form of a continuous rod of the required filter rod circumference. In such case the extrudate may be passed through sizing means, tubular sizing means for example, in order to ensure a consistent and accurate rod circumference. After formation to size the rod is cut into, for example, lengths six times unit filter element length.

Examples of the subject invention are as follows:

EXAMPLE I

A 50%:50% dry blend of polypropylene granules and Pfizer dietary fibre was fed to a Baker Perkins twin-shaft cooker extruder at a feed rate of 9.5 Kg/hr. The extruder was operated at a shaft speed of 110 rpm and with an outlet die temperature of 126° C. Water was fed to the barrel of the extruder at a feed rate of one liter per hour.

The resultant extrudate was a white, fluffy, soft but self-sustaining rod of a density of 0.032 g/cc.

EXAMPLE II

A 50%:50% dry blend of polypropylene granules and methyl cellulose granules manufactured by Celanese Corporation under designation M450 was fed to the extruder used in Example I at a feed rate of 16.0 Kg/hr. The operating conditions were: shaft speed—130 rpm; outlet die temperature—140° C.; and water feed rate—two liters per hour.

The resultant extrudate was a white, bubbly, firm, self-sustaining rod of a density of 0.053 g/cc.

The rods extruded in Examples I and II were suitable for being shredded top provide pieces of cigarette filler size for feeding to a cigarette making machine for the manufacture of wrapped filter rod.

We claim:

1. A method of making tobacco smoke filter elements comprising foamed filtration material, which comprises;
   (a) providing a plastics extruder including an extruder die having an exit orifice;
   (b) feeding to the extruder a mixture of
      (i) from 5% to 95% on a dry weight basis of a particulate plastics material selected from the group consisting of polypropylene, cellulose acetate, polyethylene, polyester, viscose, nylon and mixtures thereof,
      (ii) from 95% to 5% on a dry weight basis of a polysaccharide expansion medium selected from the group consisting of starch, modified starch, cellulose, modified cellulose and mixtures thereof,
      (iii) water, and
      (iv) from 0% to 5% on a dry weight basis of a binder;
   (c) extruding the mixture under such heat and pressure conditions whereby immediately upon emergence of the extrudate from the extruder die, at least a portion of the water flashes into steam, thereby creating cells within the extrudate and a consequent swelling whereby the extrudate assumes a cross-section dimension greater than that of the exit orifice of said extruder die; and
   (d) feeding the extrudate continuously to the garniture of a filter making machine.

2. A method according to claim 1, wherein said extrudate takes the form of a continuous rod of open cellular structure, said rod being cut into lengths of multiple of unit filter element length.

3. A method of making tobacco smoke filter elements comprising foamed filtration material, which comprises;
   (a) providing a plastics extruder including an extruder die having an exit orifice;
   (b) feeding to the extruder a mixture of
      (i) from 5% to 95% on a dry Weight basis of a particulate plastics material selected from the group consisting of polypropylene, cellulose acetate, polyethylene, polyester, viscose, nylon and mixtures thereof,
      (ii) from 95% to 5% on a dry weight basis of a polysaccharide expansion medium selected from the group consisting of starch, modified starch, cellulose, modified cellulose and mixtures thereof,
      (iii) water, and
      (iv) from 0% to 5% on a dry weight basis of a binder;
   (c) extruding the mixture under such heat and pressure conditions whereby immediately upon emergence of the extrudate from the extruder die, at least a portion of the water flashes into steam, thereby creating cells within the extrudate and a consequent swelling whereby the extrudate assumes a cross-section dimension greater than that of the exit orifice of said extruder die,
   (d) shredding the extrudate to obtain particles of the extrudate, and
   (e) feeding the extrudate particles to a cigarette making machine, operable to produce tobacco smoke filter elements.

4. A method according to claim 1 or 3, wherein there is additionally fed to said extruder one or more of a nucleating agent, a humectant and a lubricant.

5. A method according to claim 1 or 3, wherein said extrudate upon leaving the extruder die orifice is subjected to a draw down step whereby there occurs a decrease in the thickness thereof.

6. A method according to claim 1 or 3, wherein said particulate material is treated with a bonding agent.

\* \* \* \* \*